(12) United States Patent
Ford (10) Patent No.: US 8,316,135 B2
(45) Date of Patent: Nov. 20, 2012

(54) HIGHLY SCALABLE NETWORK ENVIRONMENT FOR MANAGING REMOTE DEVICES

(75) Inventor: James O. Ford, Bothell, WA (US)

(73) Assignee: Arris Group, Inc., Suwanee, GA (US)

( * ) Notice: Subject to any disclaimer, the term of this patent is extended or adjusted under 35 U.S.C. 154(b) by 528 days.

(21) Appl. No.: 11/937,442

(22) Filed: Nov. 8, 2007

(65) Prior Publication Data

US 2009/0125627 A1    May 14, 2009

(51) Int. Cl.
*G06F 15/16* (2006.01)
(52) U.S. Cl. .................................................. 709/227
(58) Field of Classification Search .................. 709/224, 709/227
See application file for complete search history.

(56) References Cited

U.S. PATENT DOCUMENTS

| | | | |
|---|---|---|---|
| 6,701,329 B1 * | 3/2004 | Esibov et al. ........................ 1/1 |
| 2002/0095600 A1 | 7/2002 | Deen | |
| 2002/0103898 A1 | 8/2002 | Moyer | |
| 2003/0171113 A1 * | 9/2003 | Choi ............................ 455/420 |
| 2003/0236841 A1 * | 12/2003 | Epshteyn ...................... 709/206 |
| 2004/0221035 A1 * | 11/2004 | Morikawa ..................... 709/224 |

OTHER PUBLICATIONS

International Search Report mailed Jul. 6, 2009, issued in corresponding Application No. PCT/US2008/082752, filed Nov. 7, 2008.
Written Opinion of the International Searching Authority mailed Jul. 6, 2009, issued in corresponding Application No. PCT/US2008/082752, filed Nov. 7, 2008.

* cited by examiner

*Primary Examiner* — Ario Etienne
*Assistant Examiner* — Hee Soo Kim
(74) *Attorney, Agent, or Firm* — Troy A. Van Aacken; Robert J. Starr (57) ABSTRACT

A highly scalable primary server is provided to serve an increasing number of users and remote devices. Instead of communicating with a primary server using an expensive communication protocol, a remote device communicates with a secondary server using a less expensive protocol to determine whether the primary server desires to communicate control instructions to the remote device. When the primary server has a request to control the remote device, the primary server creates a table entry to the secondary server to notify the remote device of a request to communicate. Upon polling the secondary server and learning of the created table entry, the remote device establishes a communication connection with the primary server to receive the instructions for controlling the remote device. In this manner, the demand for resources needed for communication with the primary server is significantly reduced.

52 Claims, 9 Drawing Sheets

HIGHLY SCALABLE NETWORK ENVIRONMENT FOR MANAGING REMOTE DEVICES

BACKGROUND

As networks such as the Internet continue to expand and become more popular, users are increasingly interested in controlling remotely located devices. In some cases, remote access services are available, which enable users to access and/or control devices remotely over the Internet. For example, a user can use a remote access server to instruct a home video recorder to record a particular TV program while using a personal computer at work. For another example, a user can schedule to turn on/off an alarm system, lights, etc.

Devices that are remotely accessible through an open network like the Internet are often vulnerable to unauthorized access. To address this concern, devices in a network may be coupled to a security system, such as a hardware or software "firewall" that filters data to prevent unauthorized access of the devices. For example, a firewall router may be configured to allow the devices to transmit outbound data but not receive remotely sourced inbound traffic.

In some conventional systems, to determine whether remote access to a device is desired, the device may establish a dedicated communication connection with the remote access server and maintain the communication connection open almost indefinitely. The communication connection between the device and the remote access server may be automatically re-established if the communication connection is accidentally disconnected. Maintaining such a communication connection using a secured protocol is computationally expensive and resource consuming. Alternatively, the device may have to repeatedly poll a remote access server that handles access requests for the device in order to determine whether remote access to a device is desired. For example, in some cases a user may wish to remotely access and control the device. In other cases, the remote access server may need to directly instruct a device to perform actions such as downloading and installing a new version of a software application. For each instance in which the device polls the remote access server, the device communicates with the remote access server using a computationally expensive communication protocol, such as a Secured Socket Layer (SSL)/Transport Layer Security (TSL) protocol that requires the remote access to have an available socket for a communication connection.

Currently, most remote access services have various capacity restrictions that limit their ability to accommodate a growing need for remote access services due to increasing network size and a growing number of users and associated devices. Further, each session connection between a device and a remote access server requires significant resources of the remote access server, which makes it difficult to scale the remote access server to serve an increasing number of users and remote devices. One possible solution is to add more hardware to the remote access server to increase the computing capacity of the remote access server, but adding more hardware is costly and complicated and maintaining established connections is overlooked. Another solution is to increase the polling interval of each device to reduce the number of session connections required for the polling performed by each device. However, a longer polling interval means longer average latency in responding to an access request.

Thus, there is a need for a framework to reduce expensive communications in a network while allowing more users to quickly and securely control remote devices.

SUMMARY

A method and system are provided to enable a user or process to control a device that is remotely located in a network. A request to control a remote device is handled by a primary server. Expensive and costly polling of the primary server by the device is replaced with inexpensive polling of a secondary server. In one embodiment, the remote device communicates with a secondary server, such as a domain name service (DNS) server, using a lightweight protocol to determine whether the primary server wants to communicate with the remote device. For its part, when the primary server has a request to control the remote device, the primary server creates a table entry to the domain name server to notify the remote device of a request to communicate. Upon polling the domain name server and learning of the table entry in the name table, the remote device initiates a communication connection with the primary server to receive the instructions for controlling the remote device. In this manner, the remote device and the primary server directly communicate with each other using an expensive communication connection only when the primary server has a pending request to access or control the remote device.

In one aspect, a method is provided for a device protected by a firewall to communicate with a primary server when the primary server has indicated a need of communication. The primary server indicates a need of communication by creating a table entry in a secondary server that is polled by the device using a lightweight protocol for a communication. The method includes transmitting an inquiry from the device to the secondary server to determine whether the secondary server has a name table with a table entry corresponding to the device. The secondary server has a table entry corresponding to the device; the device then establishes a communication connection with the primary server that enables the primary server to communicate with the device through the firewall. The device receives information that the primary server via the communication connection.

In yet another aspect, the primary server may embed instructions for the device in a table entry in the secondary server. The device polls the secondary server for the entry and receives a response including instructions from the secondary server. The device may identify the instructions from the response and perform the instructions without having to establish an expensive direct communication with the primary server.

DETAILED DESCRIPTION

Generally described, the present application is related to a method and system for processing an access request to control a remotely located device. More specifically, a method and system are provided where the need for expensive communication connections between a primary server and a remote device is reduced by eliminating the need for repetitive, expensive, and costly polling of the primary server. For example, in one aspect, instead of communicating with a primary server via an expensive communication protocol connection, a remote device communicates with a secondary server via a less expensive protocol connection to determine whether a primary server desires to communicate control instructions, for example from a user, to the remote device. An "expensive communication protocol" refers to a communication protocol that requires a greater amount of resources (such as bandwidth, sockets, processing time, etc), for communication than a lighter weight communication protocol. Typically, the polling of the secondary server can use a less expensive communication protocol compared to the polling of the primary server. A less expensive communication protocol (hereinafter, lightweight communication protocol) refers to a communications protocol designed with less complexity in order to reduce the resources needed for communication. For example, a connectionless protocol like UDP having shorter fixed-length headers is less expensive (lightweight) compared to a protocol having longer variable-length headers because of the smaller amount of data and less processing time needed for communication.

In accordance with one feature described herein, a secondary server may be a name server including a name table of remote devices. Upon processing a request to control a remote device, a primary server may cause a secondary server to update a name table with an entry that identifies the remote device to be controlled. The table entry is used to signal the device that a communication with the primary server is desired. Using a lightweight communication protocol, the remote device polls the secondary server, e.g., in accordance with a standard DNS query, to determine whether the name table includes an entry that identifies the remote device. If the name table includes an entry that identifies the remote device, the remote device may then communicate with the primary server. One example of the lightweight communication protocol may be a connectionless protocol where a device at one end of the communication link transmits data to the other end without first ensuring that the recipient is available and ready to receive the data. Polling using a connectionless protocol generally requires a smaller amount of data to be exchanged as compared to polling using an encrypted or persistent connection-oriented (i.e., more expensive) protocol. For example, using a lightweight communication protocol such as a User Datagram Protocol (UDP), such polling of the secondary server may require two data packets to be exchanged. Further, the size of each data packet for UDP is typically smaller than the size of a data packet for an encrypted or persistent connection-oriented protocol such as when using SSL.

Figure 1:
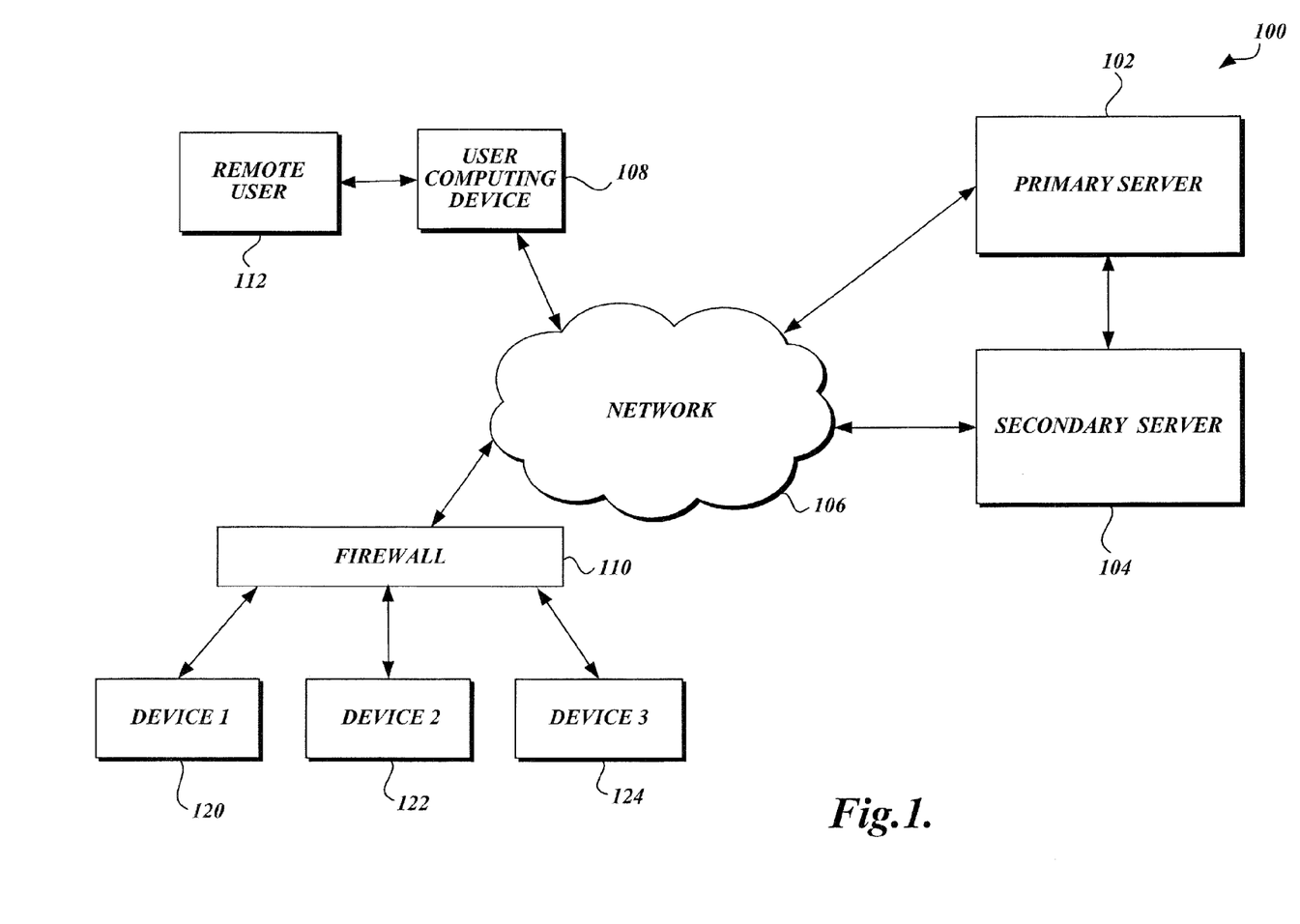
FIG. 1 is a pictorial diagram depicting one example of an environment 100 in which a remote access service system described herein may operate.

A pictorial diagram in FIG. 1 depicts one example of an operating environment 100 for a remote access service system. The operating environment 100 of FIG. 1 includes one or more user computing devices, such as a user computing device 108, by which a user 112 can interact with a primary server 102 via a communication network 106, such as the Internet.

User computing devices, such as the user computing device 108, typically include a variety of configurations or implementations such as, but not limited to, laptop or tablet computers, personal computers, personal digital assistants (PDAs), hybrid PDA/mobile phones, mobile phones, workstations, and the like.

The primary server 102 may comprise one or multiple more servers or computing components to provide remote access services that enable users to control or access remotely located devices via networks. The primary server 102 is communicatively connected to the user computing device 108 via the network 106 to facilitate requests from the user 112 for remote access services. Further, the primary server 102 may include a database for storing information about each user and the remote devices associated with each user in order to assist a user to view/control the remote devices that the user has authority to access. For example, a user may be allowed to control a television set top box but not an alarm system. As will be discussed in greater detail below, when a user requests to control a remote device, such as remote devices 120, 122, 124, through a user computing device 108, the primary server 102 may first check whether the user is authorized to access the remote device by investigating the user information stored in the database. As will be appreciated by one skilled in the art, the database can be local or remote to the primary server 102. In one embodiment, the primary server 102 may present a graphical user interface on the user computing devices, listing serviceable remote devices that the user can control or access via the remote access services provided by the primary server 102. The remote devices 120, 122, 124 can be any electronic device which is capable of establishing a communication connection with the primary server 102 and capable of implementing instructions indicated by the primary server 102. Examples of remote devices include, but are not limited to, video recorders, computers, media centers, thermostats, power modules, alarm systems, lights, kitchen appliance, equipment, etc. For example, when a user is away from home, the user can monitor temperatures in the user's home by reading a thermostat, turn off/on lights, control an alarm system, or record a TV show through the remote access services provided by the primary server 102.

In some instances, a set of remote devices may be controlled by a central device that is capable of establishing a communication connection via networks and is capable of processing instructions indicated by the primary server 102. In this embodiment, the central device may be utilized by remote devices that do not have the functionality to establish a communication connection on their own or to process instructions. The set of remote devices and the central device may be connected in a local network, such as a home network, etc.

As shown, the remote devices may be protected by a "firewall" 110, which prevents unauthorized incoming data from being communicated to the remote devices. Under a security policy, the firewall 110, such as a secured router, may be configured to prevent the protected devices from receiving remotely sourced data traffic before a secure communication connection is established. Thus, in order to establish a communication connection with the primary server 102, the devices 120, 122, 124, first open a session connection to negotiate with the primary server 102 for establishing a communication connection, such as an SSL/TSL connection.

Under a conventional approach, a device behind the firewall may be required to periodically poll the primary server 102 to see if the primary server 102 wishes to make a communication connection with the remote device. Such readily available connectivity between the remote device and the primary server 102 is important if a user wants to control or access the device in near real-time because, with a firewall protection, the primary server 102 may not be allowed to directly notify the remote device when the primary server 102 wants to communicate with the remote device on behalf of a user. Most of the time, such polling of the primary server 102 establishes a connection only to check whether there is a need to communicate with the primary server 102. Each session connection between a remote device and a primary server, even for simple polling is expensive, meaning it requires significant resources (e.g., bandwidth, sockets, etc.) of the primary server, which can make it difficult to scale the primary server to serve an increasing number of users and remote devices.

While the communication between the primary server 102 and the remote device typically uses an expensive communication protocol, such as connection-oriented or secured protocols that require handshaking, the present invention recognizes that other available communications between a secondary server and the remote device can use a lightweight communication protocol. For example, the secondary server and the remote device may communicate via a connectionless communication. In this example, the connectionless communication is lightweight (i.e., requiring less resources) compared to the connection oriented communication used with the primary server. As will be appreciated by one of ordinary skill in the art, the connection oriented communication may require establishing an end-to-end connection before any data is sent while the connectionless communication does not require such end-to-end connection and more data packets are exchanged to establish an end-to-end connection.

In an aspect of the present invention, such expensive polling of the primary server 102 can be replaced with lightweight polling of the secondary server 104. In one particular example, the secondary server 104 may be a standard domain name server that is configured to maintain name tables where host name data for a remote device and associated information such as a matching IP address, etc., can be stored. As will be appreciated by one of ordinary skill in the art, communications with the secondary server 104 in this particular embodiment can be connectionless. The remote device at one end of the communication transmits data to the secondary server, without needing to first ensure that the secondary server is available and ready to receive the data. Preferably, the secondary server 104 will respond to the remote device when a communication is received. Communications between the secondary server 104 and the remote device can be utilized for polling in place of the polling between the remote device and the primary server 102. In this manner, the number of session connections between the remote device and the primary server 102 is significantly reduced. Fewer session connections mean less resources are required from the primary server in order to service an increasing number of remote devices and their users.

Although illustrative embodiments described herein are explained in conjunction with a secondary server maintaining a name table, the secondary server can be any network location or network presence where the primary server 102 can leave information to notify a remote device 120, 122, 124, that a communication with the remote device is desired. In the embodiment described above, a remote device can determine whether the primary server 102 needs to communicate with the remote device by checking a name table in the secondary server 104 via a lightweight communication protocol. For example, if an entry corresponding to the remote device has been created in the name table, the remote device may assume that the primary server 102 wants to communicate. The remote device will then start a session connection with the primary server 102.

In order to determine whether the primary server 102 wants to communicate so that the user request can be fulfilled in near-real time, the remote device periodically transmits to the secondary server 104 a query for a table entry. Upon receipt of a query from the remote device, the secondary server 104 checks its a name table for an entry that corresponds to the remote device. In one embodiment, the secondary server 104 may allow the information held in the secondary server 104 to be dynamically updated by the primary server 102 whenever the primary server 102 has a need to communicate with the remote device.

Figure 2A:
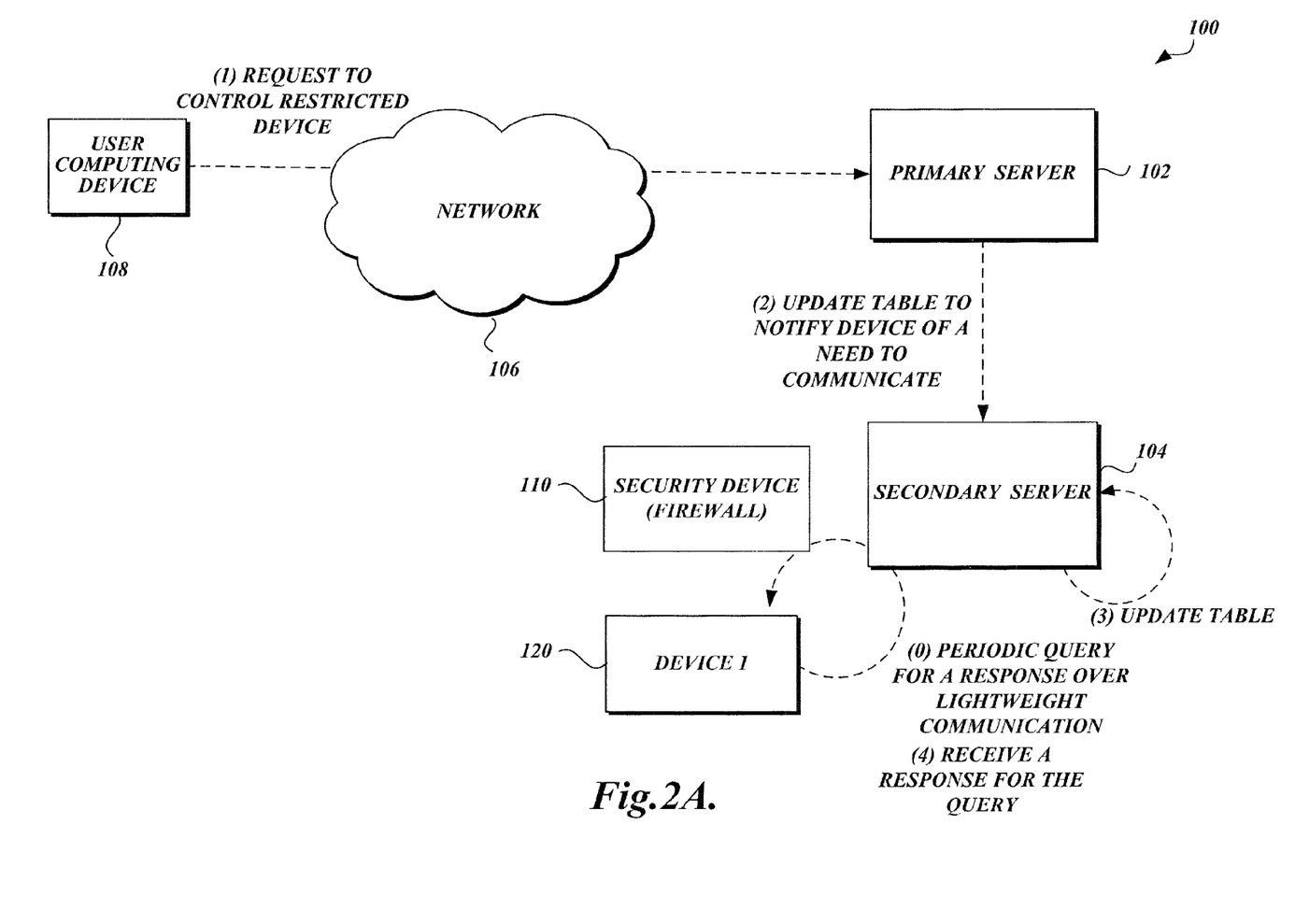
FIGS. 2A and 2B are block diagrams depicting interactions between various components shown in the operating environment 100 of FIG. 1 where an expensive communication connection is established between a remote device and a primary server only when a table entry for the remote device has been created in a secondary server.
Figure 2B:
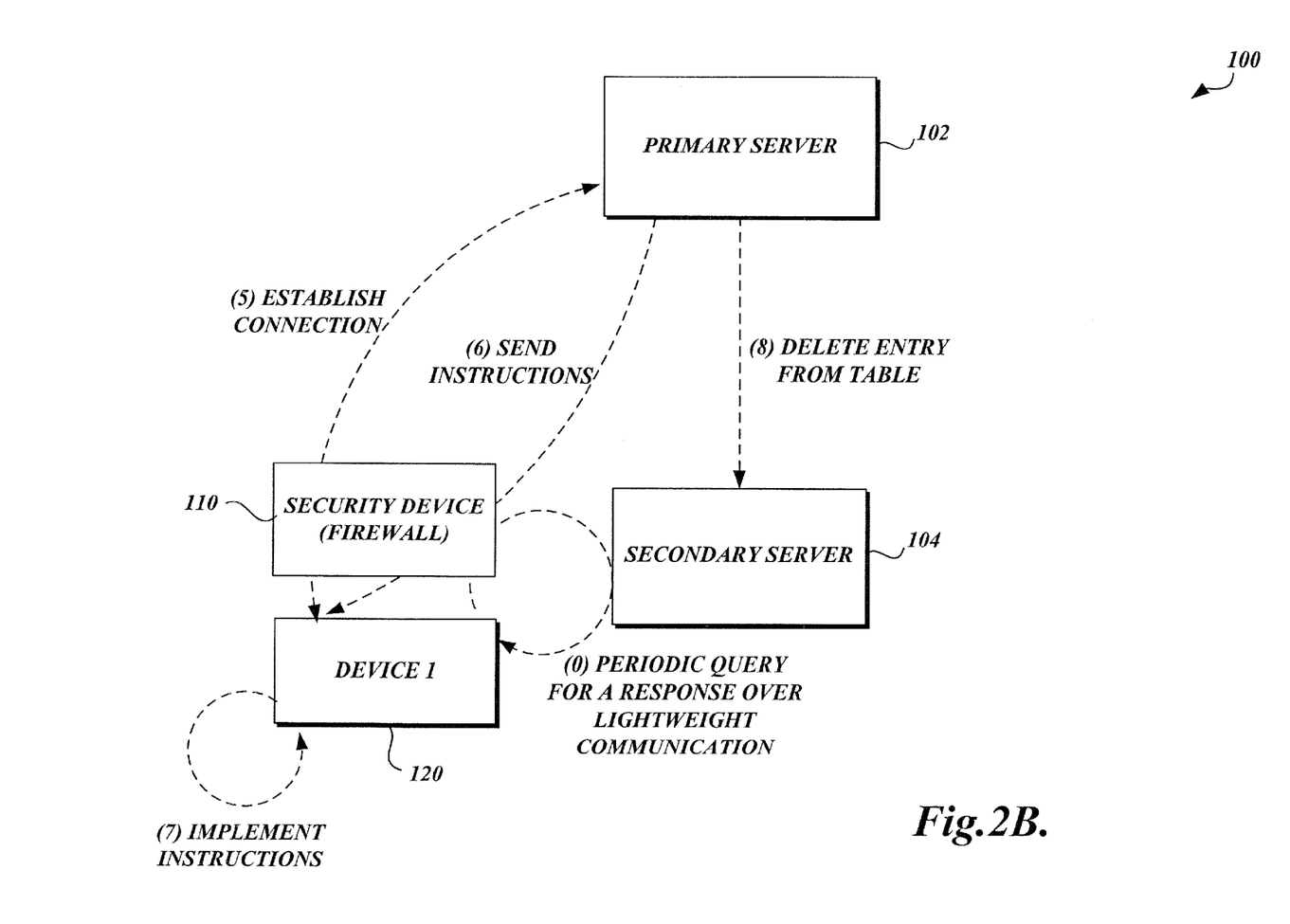

FIGS. 2A and 2B provide block diagrams that depict interactions between various components in the operating environment 100 of FIG. 1. A communication connection is established between a remote device and the primary server when a table entry for the remote device has been created in the secondary server. A user (not shown) operating a user computing device 108 coupled to the network, such as the Internet 106, may request access to one of the remote devices 120. For the purpose of discussion, the following discussion assumes that the remote devices 120 are located behind a firewall, such as a security device 110, which that is configured to prevent the remote devices from receiving remotely sourced traffic outside a secure communication connection. The discussion further assumes that the primary server 102 is not able to communicate with the remote device 120 unless the remote device 120 initiates a secure communication connection with the primary server 102 and successfully negotiates the connection. Although the following embodiments are described in the context of requiring secure communication connections, such communication connections, such embodiments should not be considered limiting. Moreover, the described embodiments are applicable to any type of operating environment where a communication protocol used between the secondary server and the remote device is less expensive (lightweight) as compared to a communication protocol used between the primary server and the remote device. In one embodiment, a group of remote devices, such as home devices connected in a home network, may be securely connected to the Internet via a firewall. As will be appreciated by one of ordinary skill in the art, the firewall may be any type of security system including security hardware (e.g., a secured router, etc.) and/or software.

As depicted in FIG. 2A, after the user computing device 108 receives a remote access request for a remote device 120, the user computing device 108 transmits the remote access request to the primary server 102. Upon receipt of the user request, the primary server 102 may verify whether the request is valid or authorized. There are many ways to receive and verify a remote access request from a user. For example, the primary server 102 may present a list of serviceable remote devices along with remote access requests from which the user is allowed to select. The serviceable remote devices may be devices that the user is allowed to access or control via the primary server 102. For example, at the time of registration with the primary server 102, a user may have provided a list of remote devices, host names of the remote devices, geographic location of the remote devices, etc., for receiving remote access service via the primary server 102. In some cases, the user can add or remove a remote device from the serviceable remote device list at any time. The primary server 102 may store such user profile information, authentication information, a list of serviceable remote devices, etc., in its database.

In some instances, a group of users can access or control a remote device. For example, the primary server 102 may allow a group of employees to access or control remote devices belonging to a company. Further, several identical or similar devices can be remotely accessed or controlled by one user. Each device may be assigned unique identification information, such as a distinguishable host name. For example, serviceable devices for a user may include several TVs, each of which can be identified by a host name, such as "Living Room TV," "Master Bedroom TV," "Basement TV," etc.

When the primary server 102 detects a need to instruct a remote device, for example, to service a remote access, to update a software application, to turn on/off remote devices, etc., the primary server 102 causes the secondary server 104 to create or update a name table with a table entry corresponding to the remote device in the secondary server 104. As described above, the table entry in the secondary server 104 can be dynamically updated in near real time or at least with little delay. For the purpose of discussion, it may be assumed that the secondary server 104 maintains a name table storing various types of entries, host name information, dynamically assigned IP addresses, the times of the assignments, or the like. In addition, it may be assumed that the remote device 120 is configured to periodically query, as a part of a polling routine, the secondary server 104 to see whether a table entry corresponding to the remote device 120 has been created or updated in the name table. Upon receipt of the query, the secondary server 104 looks up the name table and determines if a table entry for the remote device 120 exists in the name table. If the table entry is found, the secondary server 104 transmits to the remote device 120 a response indicating that the table entry exists.

As depicted in FIG. 2B, the remote device 120 receives a response from the secondary server 104 indicating that an entry for the remote device 120 exists in the name table. In one embodiment, the secondary server 104 may send a positive response to indicate that the table entry for the remote device 120 exists in the name table or a negative response to indicate that the table entry for the remote device 120 does not exist (or has expired) in the name table. Alternatively, in another embodiment, the secondary server 104 may send a response to the remote device only if a table entry corresponding to the device is found in the name table. If a table entry is not found, no response is sent to the remote device. After a timeout period with no response, the remove device 120 may assume that a table entry corresponding to the device does not exist in the name table. Upon receipt of a positive response from the secondary server 104, the remote response device 120 determines that the primary server 102 needs to communicate with the remote device 120. The remote device 120 initiates a communication connection between the primary server 102 and the remote device 120 in accordance with a more expensive communication protocol, such as a SSL/TSL protocol.

As will be appreciated by one of ordinary skill in the art, the remote access request can be translated into a single task or a series of tasks (instructions). For example, the primary server 102 may parse the remote access request into several tasks which the remote device 120 can perform. Tasks (instructions) are transmitted from the primary server 102 to the remote device 120 over the communication connection once it is established. In some instances, the primary server 102 may need to communicate with a remote device 120 even when a specific remote access request has not been received from a user. As with the instance described above, the primary server 102 causes the secondary server 104 to update or create a table entry corresponding to the remote device 120 with which the primary server 102 wishes to communicate. As will be described in greater detail below, the instructions or tasks can be transmitted in the form of text messages, predefined instructions, reserved IP addresses, etc.

The remote device 120 fulfills a remote access request by implementing tasks (instructions) transmitted by the primary server 102. For example, if the remote access request is for a video recoding device to start recording particular media content, either immediately or at a time communicated in the instruction, the video recording device may receive from the primary server 102 a series of instructions, for example: 1) turn on the video recording device, 2) locate the channel showing the particular media content, 3) record the media content, etc. In this example, if the video recoding device (remote device 120) receives such instructions while recording other programs or content, the video recoding device may stop the current recording and start a new recording in order to fulfill the request from the user.

In some embodiments, remote access requests may require a confirmation from the remote device 120 after the remote access request is initiated or completed. In such embodiments, after the remote device 120 fulfills the remote access request, the remote device 120 may send an appropriate confirmation to the primary server 102. Likewise, the device may send a notification that the user request has not been fulfilled to the primary server 102 and may wait for further instructions from the primary server 102 over the established communication connection. The primary server 102 can then optionally transmit to the device a further task or instructions.

Upon receipt of the confirmation (notification) or after a threshold time, the primary server 102 may clear or delete the created entry corresponding to the remote device 120 in the name table. The threshold time may be defined such that a created entry in the name table will expire after a specific time. This may prevent the created entry from being returned as part of the response from the secondary server 104 more than once.

It is to be noted that the above embodiments and the examples are described as exemplary purposes only. Further, other types of DNS information in the secondary server 104 can be used by the primary server 102 to reflect the remote access request. For example, when the primary server 102 needs to communicate with a particular remote device 120, different types of entries in the name table can be created or updated. That is, some of the DNS native records can be used to contain instructions or tasks. For example, a TXT record may be used to contain, for example, time information about the entry creation or to contain a simple instruction such as "Turn on," "Turn off," "Connect," "Increase a polling period," "Decrease a polling period," etc. As will be appreciated by one of ordinary skill in the art, a TXT record can include an arbitrary length of text strings which can be attached to a given DNS device, thus allowing the primary server 102 to insert instructions or commands into a DNS record without changing the behavior of the secondary server 104. In this embodiment, a remote device 120 may transmit a query for a TXT record corresponding to the remote device 120, as part of polling on the secondary server 104.

Likewise, a canonical name record ("CNAME record") may be utilized for communication between the primary server 102 and the remote device 120. As will be appreciated by one of ordinary skill in the art, a CNAME record can contain information about an alias of one domain name to convey to another. Like a TXT record, a CNAME record can also contain simple instructions for the corresponding remote device 120. Depending on the type of instruction, the device may or may not have to communicate with the primary server 102 at all. For example, if the instruction is to change a room's temperature using a thermostat attached to a heater, the thermostat may not need to communicate with the primary server 102 and thus no expensive communication connection needs to be established.

In another embodiment, a set of IP addresses may be reserved to reflect instructions from the primary server 102. For example, the first 10 IP addresses available in the secondary server 104 may be reserved to indicate particular instructions or tasks. Each remote device 120 may have knowledge about the reserved IP addresses and an instruction associated with each reserved IP address. If the primary server 102 wishes to communicate with a remote device 120 for a certain instruction, the primary server 102 identifies an IP address reflecting the instruction. The primary server 102 may cause the secondary server 104 to create an entry for the remote device 120, assigning the identified IP address to a host name of the remote device 120 in the name table. In one embodiment, the remote device 120 may maintain an instruction table which includes a reserved IP address and an instruction reflected in the IP address. In that embodiment, if the secondary server 104 returns one of the reserved IP addresses in response to the query from the remote device 120, the remote device 120 may match the received IP address with the instruction table to identify the instruction indicated from the primary server 102.

| IP address | Instruction |
| --- | --- |
| xxx.xxx.xxx.xx0 | Turn On |
| xxx.xxx.xxx.xx1 | Turn Off |
| xxx.xxx.xxx.xx2 | Connect to a Server |
| xxx.xxx.xxx.xx3 | Increase a Polling interval |
| xxx.xxx.xxx.xx4 | Decrease a Polling interval |
| xxx.xxx.xxx.xx5 | TXT record query |
| xxx.xxx.xxx.xx6 | Energy Save Mode |
| xxx.xxx.xxx.xx7 | Increase a Session interval |
| xxx.xxx.xxx.xx8 | Decrease a Session interval |

As shown above, one reserved IP address may indicate a simple instruction which can be used commonly for various remote devices. For example, "Turn On," "Turn Off," "Connect to a Server," "Increase a Polling Interval," "Decrease a Polling Interval," and/or "Energy Save Mode," can be defined utilizing a reserved IP address. Some simple instructions may not require the remote device to communicate with the primary server 102 as long as receipt-confirmation is not required. For more "complicated" tasks, an IP address indicating "Connect to a Server" instruction may be initially used so that the complicated tasks can be communicated over a secure communication connection between the primary server 102 and the remote device. Here, "complicated" means requiring opening an expensive communication channel with the primary server.

Figure 3A:
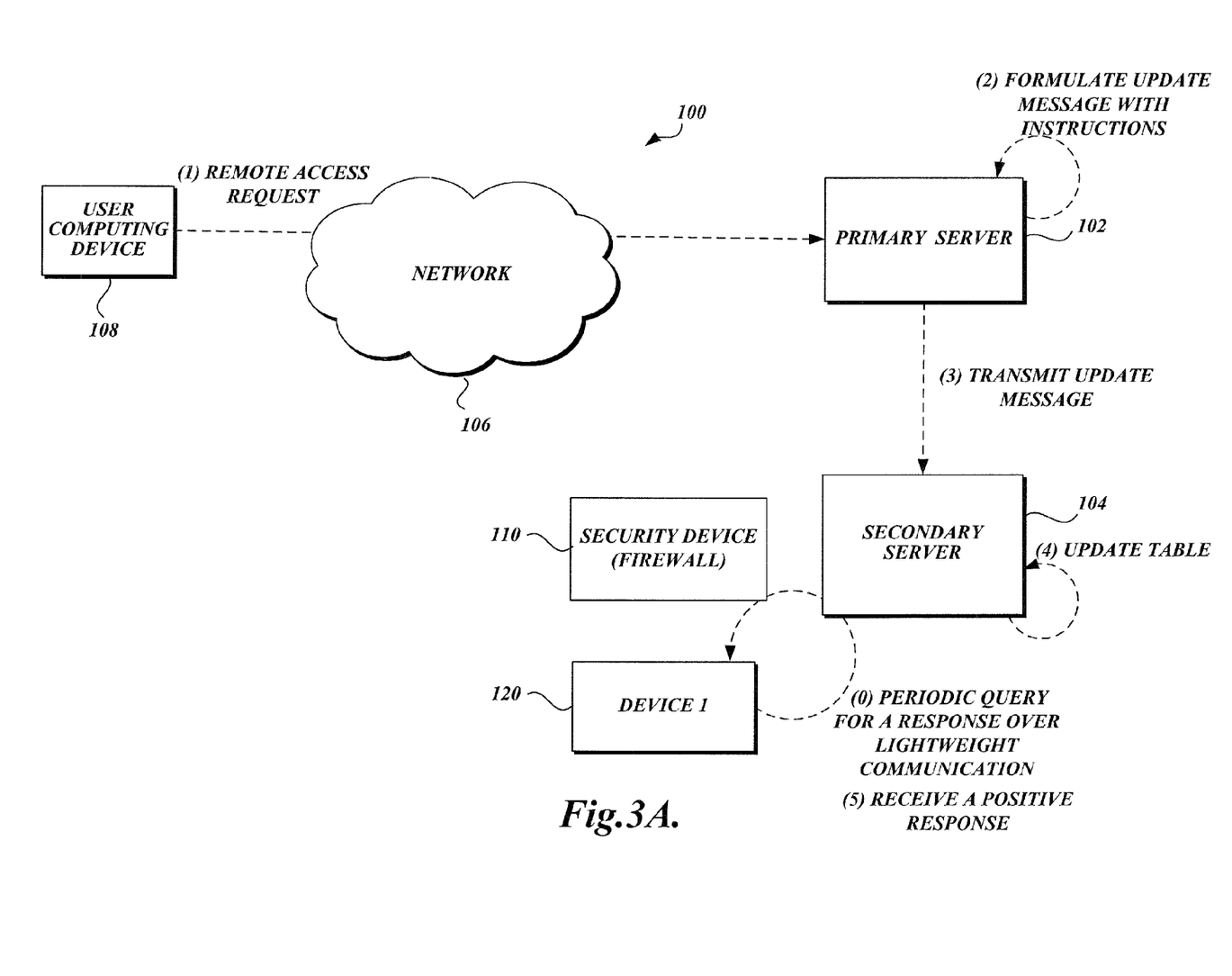
FIGS. 3A and 3B are block diagrams depicting interactions among various components shown in the operating environment 100 where information in a secondary server table entry is used to instruct a remote device.
Figure 3B:
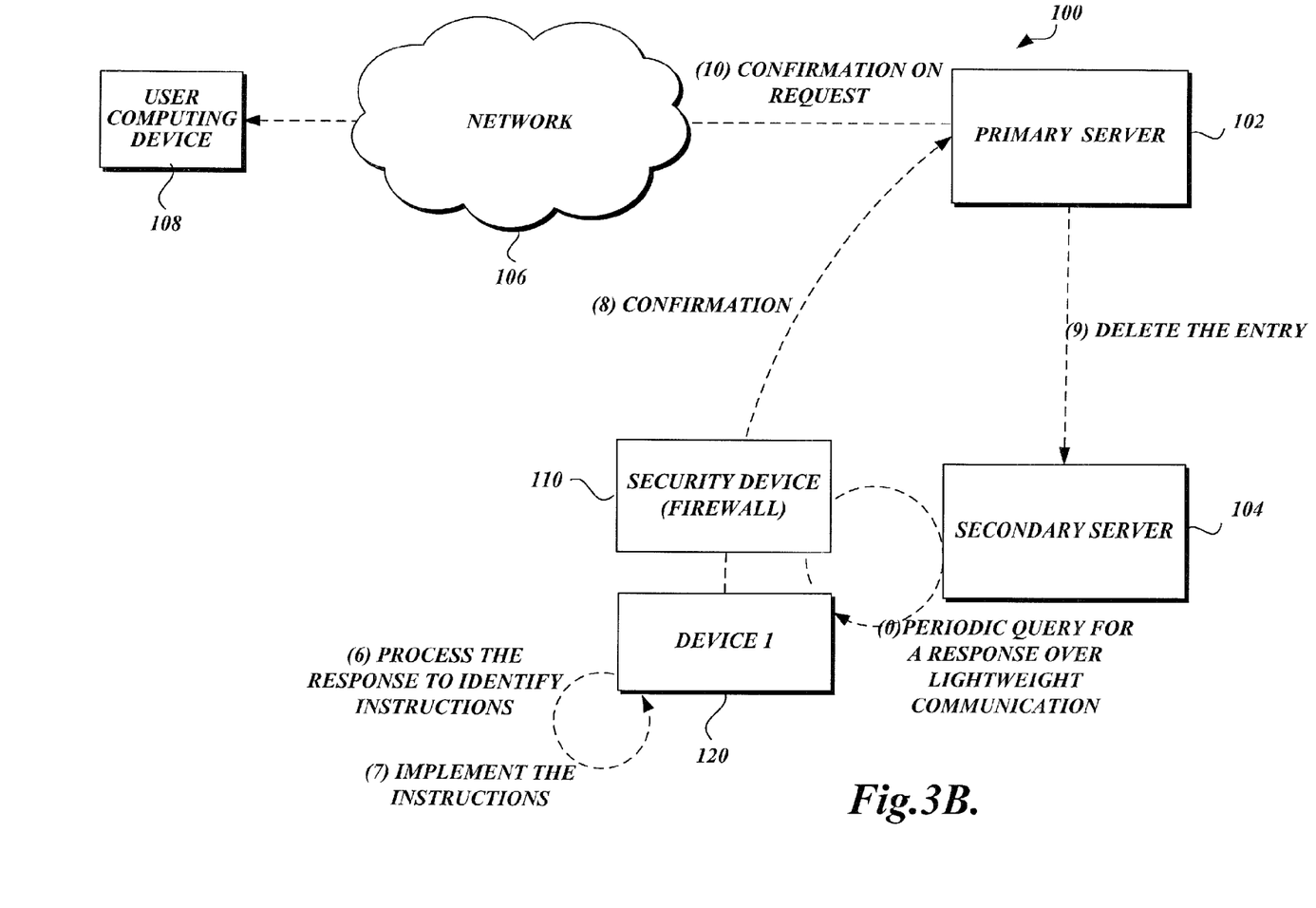

FIGS. 3A and 3B provide block diagrams that depict interactions among various components in the operating environment 100 where different types of DNS information in the secondary server 104 are used to instruct a remote device 120.

The primary server 102 may detect a need to access or control a remote device 120, or a user transmits a request to access the remote device 120. The primary server 102 formulates a message ("update message") to update an entry in the secondary server 104 based on the primary server's need or the user request. The "update message" may include the type of entry to create for a remote device 120, host name information of the remote device 120, identification information of the remote device 120, etc. The primary server 102 transmits the "update message" to the secondary server 104 in order to reflect the request received from the user. The secondary server 104 then creates an entry in the name table in accordance with the "update message."

As described above, a remote device 120 is configured to periodically query (i.e., poll) the secondary server 104 to see whether a certain type of entry corresponding to the remote device 120 exists within the secondary server 104. The remote device 120 may recognize a simple instruction or notification based on the result of the query. Unlike resource-intensive polling on the primary server 102, polling on the secondary server 104 generally uses a lightweight communication protocol between the secondary server 104 and the device. As will be appreciated, polling the secondary server instead of polling the primary server may significantly reduce the demand for limited resources in the primary server, such as bandwidth, hardware, processing time, etc. In addition, using lightweight polling such as UDP polling can result in a smaller size and number of exchanged data packets. Thus, the expensive communications in a network may be reduced while allowing more users to quickly control remote devices and the primary server may be highly scalable to serve an increasing number of users and remote devices.

In one aspect of the described embodiments, communications between the secondary server 104 and the remote device 120 can be implemented in accordance with the conventional domain name system. In this way, a standard port may be used for polling the secondary server 104, which allows the communication between the secondary server 104 and the remote device 120 without being filtered at the firewall.

In response to the query from the remote device 120, the secondary server 104 will return a response indicating whether a requested entry corresponding to the remote device 120 exists (positive) or not (negative). In an alternative embodiment, the remote device 120 may receive a response only if the requested entry corresponding to the remote device 120 exists. In this embodiment, if the remote device does not receive any response from the secondary server within a threshold time (i.e., the query from the remote has expired), it indicates that the response is negative.

If the response is negative, it indicates that the primary server 102 does not yet have anything to communicate with the remote device 120. However, if the response is positive, it indicates that the received response contains instructions for the remote device 120 to perform. Upon receipt of a positive response, the remote device 120 processes the response to identify the embedded instructions. For example, if the identified instruction indicates to make a connection to the primary server 102, the remote device 120 establishes a communication connection with the primary server 102 based on the underlying communication protocol and waits for further instructions from the primary server 102. As another example, if the identified instruction(s) indicates to change a polling interval, the remote device 120 changes the interval for polling on the secondary server 104 and polls the secondary server 104 in accordance with the change.

At a predetermined time after transmitting the update message, the primary server 102 may transmit another message to delete the created entry within the secondary server 104. The predetermined time may be determined based on the polling interval. For example, if a remote device 120 receives a created entry in response to polling, the created entry should not remain for the next polling. In one embodiment, the secondary server 104 may compare the time information for when an entry is created and the last polling time to determine whether the entry should expire or should be returned as a response to a query from the remote device 120.

Figure 4:
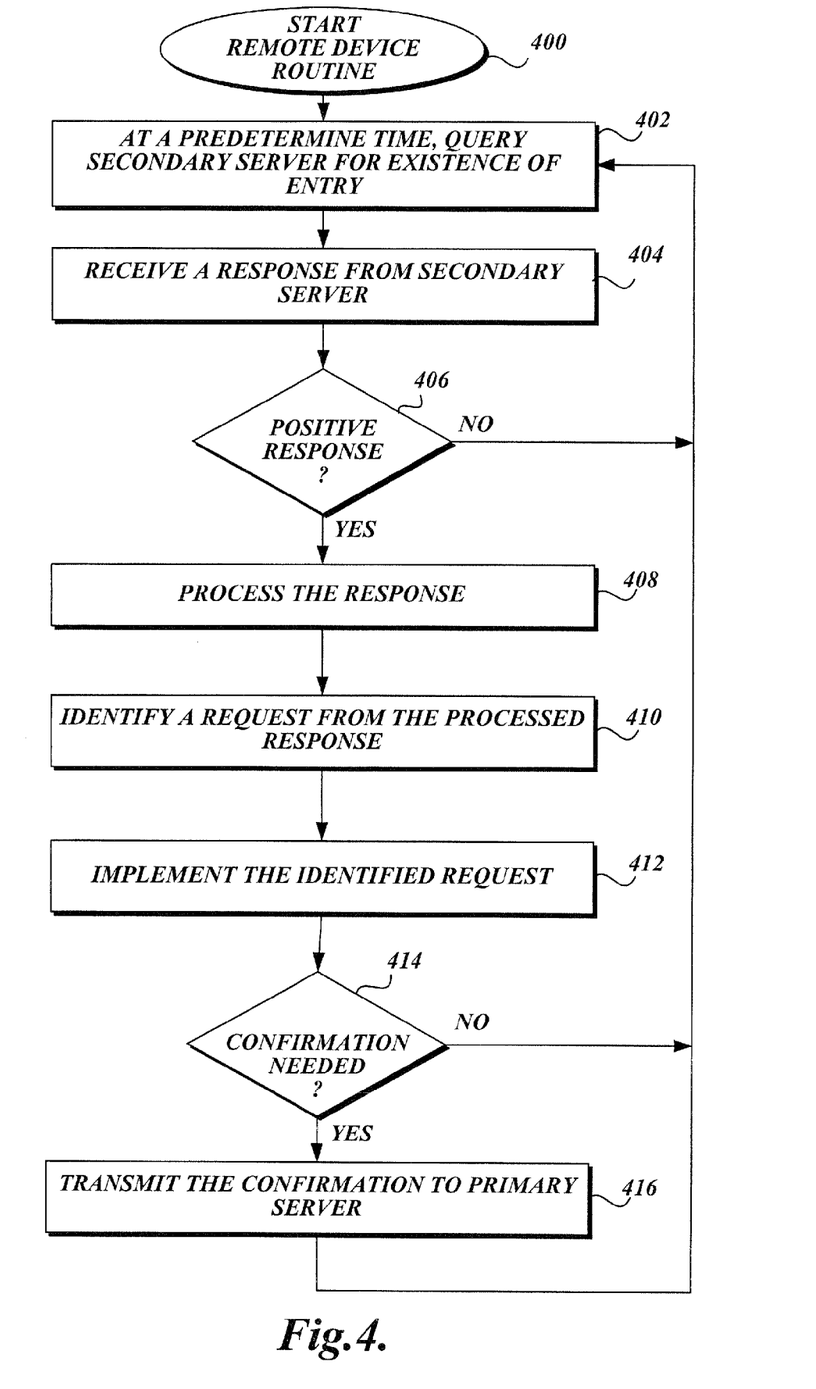
FIG. 4 is a flow diagram of one example of a routine for a remote device receiving a primary server's instructions via a secondary server.

FIG. 4 is a flow diagram of an exemplary remote device routine 400 for receiving a primary server's instructions via a secondary server. As with FIGS. 2A, 2B, assume that the secondary server is a secondary server maintaining a name table of remote devices. The described embodiments herein are used for discussion purpose only and should not be considered as limiting.

Beginning at block 402, at a predetermined time, the remote device queries the secondary server 104 to determine whether an entry corresponding to the remote device has been created. For example, at each polling interval, the remote device may transmit a query as to whether a particular type of entry has been created in the name table. The polling interval may be previously defined and tuned by the primary server 102. Generally, the polling interval is determined based on the number of users, the number of remote devices, the capacity of the secondary server, and the like. As will be understood, the polling interval is determined in such a manner that the user does not experience an unwanted delay in controlling or accessing the remote device. It is to be understood that various described embodiments allow such frequent polling that communications between a user and the primary server can often appear to be real-time.

At block 404, the remote device receives a response to the query from the secondary server. At decision block 406, it is determined whether the response is positive. In one embodiment, any positive response, i.e., a response containing some values, may indicate that an entry corresponding to the remote device exists in the name table. Likewise, a response with "no information," may indicate an entry corresponding to the remote device does not exist or has expired in the name table. In one embodiment, the primary server 102 can formulate an "update message" which includes some instructions that can be embedded in the entry corresponding to the device. As mentioned above, a DNS record, such as a TXT record or a CNAME record, can be utilized to contain instructions from the primary server.

If it is determined at decision block 406 that the response is positive since the response contains some information, the remote device will process the response at block 408. In one embodiment, the primary server 102 may define processing rules for remote devices to process the response received from the secondary server. The processing rules are also used when the primary server 102 formulates an update message to cause the secondary server to create an entry in the name table. The processing rules may specify what information in the name table is to be used by the primary server 102 to reflect the user request, or the like. At block 410, the remote device identifies instruction(s) from the processed response.

For example, if the processing rules specify that a set of reserved IP addresses is to be used to instruct the remote device, each reserved IP address may be designated to represent a specific instruction. In that example, the remote device may match the IP address contained in the response against the set of the reserved IP addresses in order to identify the particular instruction. If the IP address matches one of the reserved IP addresses, the remote device may look up the reserved IP address table where the particular instruction represented by the IP address can be found. For another example, if the processing rules specify that a particular type of record, for example, a TXT record, is used to instruct the remote device, the remote device may expect that the response contains the value of the particular type of record and parse the response to extract the instruction from the particular type of record.

If it is determined at decision block 406 that the response is not positive, the remote device may assume that the primary server 102 has not indicated a need for communication. The remote device routine 400 goes back to the step indicated by block 402 where the remote device periodically queries the secondary server. The remote device routine 400 repeats the above-mentioned steps until the remote device receives a positive response, indicating that an entry has been created in the name table.

The remote device may implement the identified request at block 412. One of the identified instructions may be an instruction to establish a communication connection with the primary server 102. In such a case, the primary server 102 and the remote device may exchange data several times (e.g., shake hands, etc.) via the firewall in order to establish a communication channel based on an expensive communication protocol (e.g., SSL/TSL). It is to be noted that there are many other ways for the primary server to instruct a remote device. As will be described in greater detail with regard to FIG. 6, in one embodiment, the primary server notifies a remote device of a need for communication with the primary server by creating an entry for the device in the secondary server.

At decision block 414, the remote device may determine whether the identified instruction requires a confirmation or notification. In some instances, the primary server 102 may want to receive a confirmation of the initiation or completion of the user request. If the confirmation is required, the remote device may transmit a proper confirmation to the primary server 102 at block 416. Likewise, in case of a failure to perform the instruction, the remote device may transmit a notification of failure to the primary server 102. If the confirmation is not required, or after transmitting the confirmation, the routine returns back to a block 402 and repeats the above mentioned steps.

Figure 5:
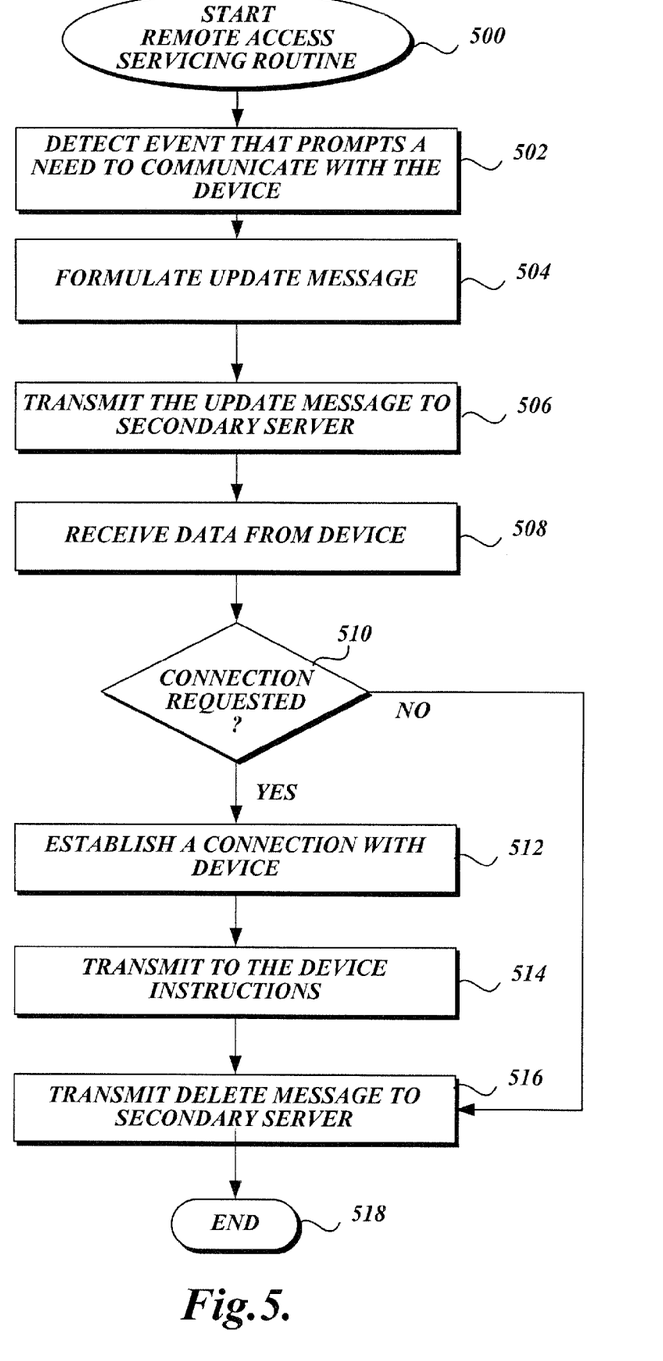
FIG. 5 is a flow diagram of one example of a servicing routine for a primary server to access and control a remote device.

FIG. 5 is a flow diagram of an exemplary remote access servicing routine 500 for accessing and controlling a remote device. As with FIG. 4, it may be assumed that the remote devices are located behind a firewall, for example, a secured router, which is configured to prevent the remote devices from receiving remotely sourced traffic before a secure communication connection is established, that is, the firewall is "opened" to the traffic. In addition, it may be assumed that the primary server 102 is not able to communicate with the remote device unless the remote device starts a secure communication connection and successfully negotiates a secure communication connection with the primary server 102.

Beginning at block 502, the primary server 102 detects an event that prompts a need to communicate with a remote device. Such an event may be triggered when the primary server 102 receives from a user a request to control a remote device or when the primary server needs to directly instruct a device to perform actions such as downloading and installing a new version of a software application. As will be appreciated by one of ordinary skill in the art, a user request can be made in various forms, such as voice, text, electronic message, or the like. Upon receipt of the request, information about the user and the associated remote devices may be obtained from the database 212. For example, the information about the user may include login information, password, customer profile, customer preference, and previous history of remote device control. In one embodiment, primary server 102 may present a graphic user interface including a list of serviceable devices to the user after the user logs in. The user may have limited access rights on some remote devices. For example, if the remote device is an alarm system, the user may not be allowed to shut off the remote device. The primary server 102 may also list access rights on each serviceable device so that the user can see all available options to access or control remote devices.

At block 504, the primary server 102 may formulate an "update message" which includes information to reflect the user request or the primary server's instructions, such as a host name of the remote device identified in the request, a type of entry in a name table, a value of the entry to be updated, etc. The "update message" will be used to cause the secondary server to update name tables. As will be understood by one of ordinary skill in the art, the update message is described as an example. Any type of information may be formulated, as long as the formulated information will cause the secondary server to update the name tables. At block 506, the formulated "update message" is transmitted to the secondary server. After the secondary server receives the "update message," the secondary server may update the name table by creating an entry corresponding to the remote device as indicated in the "update message."

Eventually, the remote device will become aware of this update in the name table through a periodic query of the secondary server over a lightweight communication connection. That is, the secondary server returns a response to the query with the created entry, which indicates that the primary server 102 wishes to communicate with the remote device, for example, to tell it to perform a task or to give it an instruction(s). Upon receipt of a response from the secondary server, the remote device will transmit to the primary server 102 data in accordance with the instructions identified from the response.

In one embodiment, the response may contain specific instructions for the remote device such that the remote device can implement the instructions without communicating with the primary server 102. Alternatively, the response may contain instructions instructing the remote device to communicate with the primary server 102 while implementing the instructions. In another embodiment, the response may be a simple flag reflecting whether the primary server 102 wishes to communicate or not. For example, if the remote device receives a positive response, the primary server 102 indicates a need for communication for further instructions. If the remote device receives a negative response, the primary server 102 has not contacted the secondary server to indicate a need for communication with the remote device.

At block 508, the primary server 102 may receive data from the remote device. At decision block 510, it is determined as to whether the remote device has sent a connection initiation for further communication with the primary server 102. If it is determined that the connection was requested by the remote device, the primary server 102 may negotiate with the remote device and establish a connection as illustrated at block 512. At block 514, the primary server 102 transmits the user request or other instructions to the remote device. After transmitting the request (at block 514), or if it is determined that the connection is not requested (at decision block 510), the primary server 102 may issue a message to delete the updated entry in the name table at block 516. The routine completes at block 518.

Figure 6:
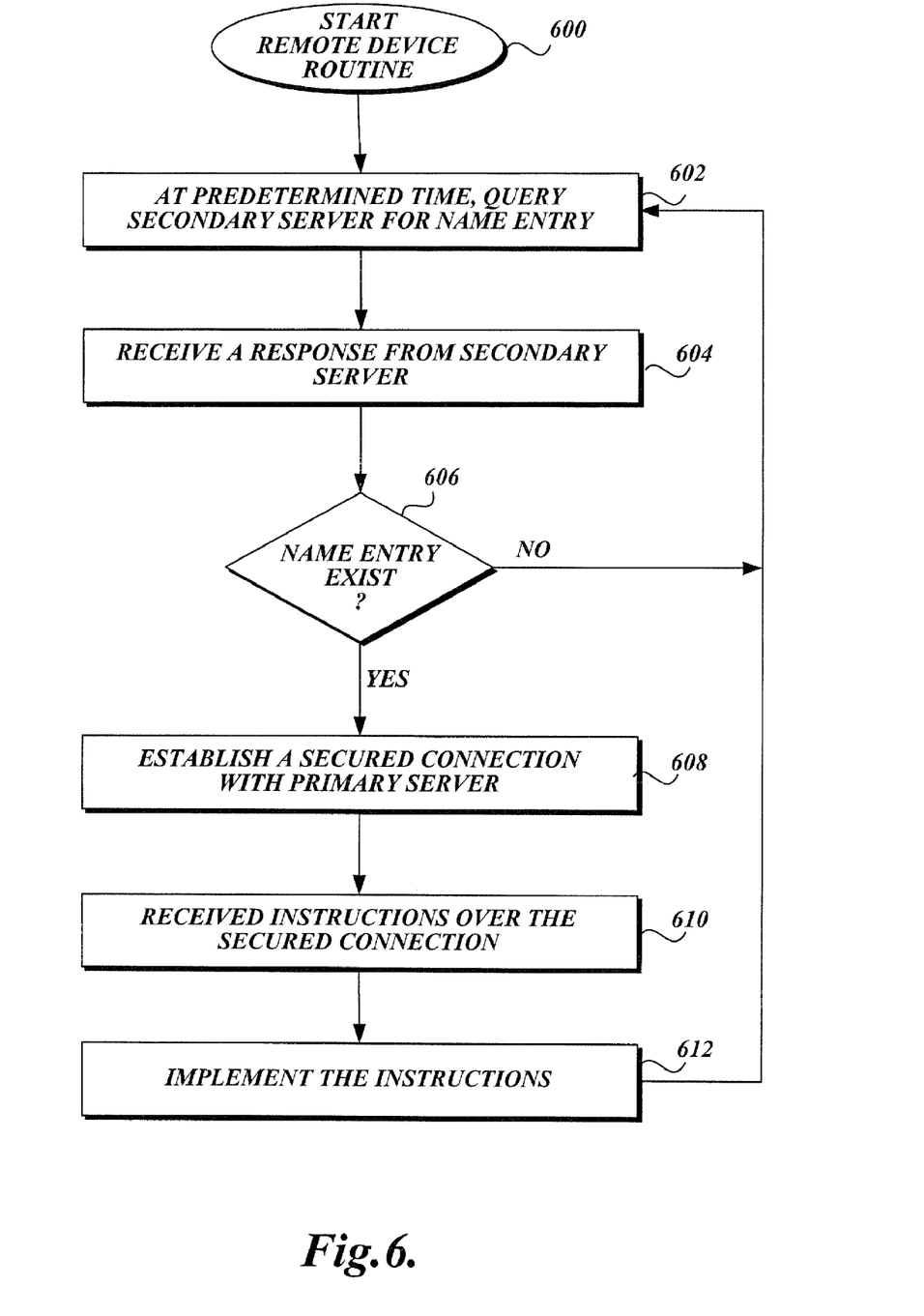
FIG. 6 is a flow diagram of another example of a routine for a remote device establishing an expensive communication connection between the device and a primary server only when a table entry for the device is created in a secondary server.

FIG. 6 is a flow diagram of another exemplary remote device routine 600 for recognizing a need for communication with the primary server from the name table where a communication connection is established between the device and the primary server only when an entry for the device has been created in the name table in the secondary server.

As with FIGS. 4 and 5, it may be assumed that the remote devices are located behind a firewall, for example, a secured router, which is configured to prevent the remote devices from receiving remotely sourced traffic before a secure communication connection is established. In addition, it may be assumed that a polling interval is defined for the remote devices to periodically poll the secondary server to determine whether the primary server 102 has indicated a need for communication. As will be understood, the polling interval can be any length of time as long as the user does not experience an unwanted delay in terms of controlling or accessing the remote device. The primary server 102 causes the secondary server to create an entry for a particular remote device in the name table if the primary server 102 wishes to communicate with the particular remote device.

Beginning at block 602, at a predetermined time, the remote device queries the secondary server as to whether its entry exists in the name table. For example, at each polling interval, the remote device may transmit a query that checks if an entry corresponding to the remote device has been created and not yet expired in the name table. At block 604, the remote device receives from the secondary server a response to the query. At decision block 606, it is determined as to whether the response indicates that an entry corresponding to the remote device exists in the name table. In one embodiment, any positive response, i.e., a response containing some values, may indicate that an entry corresponding to the remote device exists in the name table. In one embodiment, the response can be a simple indicator of a need for communication. For example, the device assumes that the primary server 102 wishes to communicate with the device if the response is positive and will subsequently try to communicate with the primary server 102 for further instructions. If the response is negative, indicating no outstanding need for communication, the device will wait until the next polling interval. This may work well with secondary servers owned by a third party, which the primary server 102 can not directly cause to update a particular type of DNS record for the remote device. That is, the primary server 102 can indirectly transmit to the secondary server a request to update an entry in the name table as a standard DNS request for a host name resolution.

If it is determined that the entry for the remote device does not exist in the name table, the routine goes back to block 602 where the remote device waits for the primary server's instruction by periodically querying the secondary server. The routine repeats the above mentioned steps until the remote device receives a positive response indicating that the primary server 102 wishes to communicate with the remote device.

If it is determined that the entry for the remote device exists in the name table, the remote device will assume that the primary server 102 wishes to communicate with the remote device and will establish a communication connection with the primary server 102 at block 608. The primary server 102 and the remote device may establish a communication channel based on the underlying communication protocol. At block 610, the remote device receives from the primary server 102 instructions over the established communication channel. At block 612, the remote device implements the received instructions. Subsequently, the remote device is ready for a next query that checks an existence of a new entry in the name table. The routine returns back to a block 602 where the remote device queries the secondary server as to whether its entry exists in the name table at a predetermined time. The routine 600 repeats the above mentioned steps.

Figure 7:
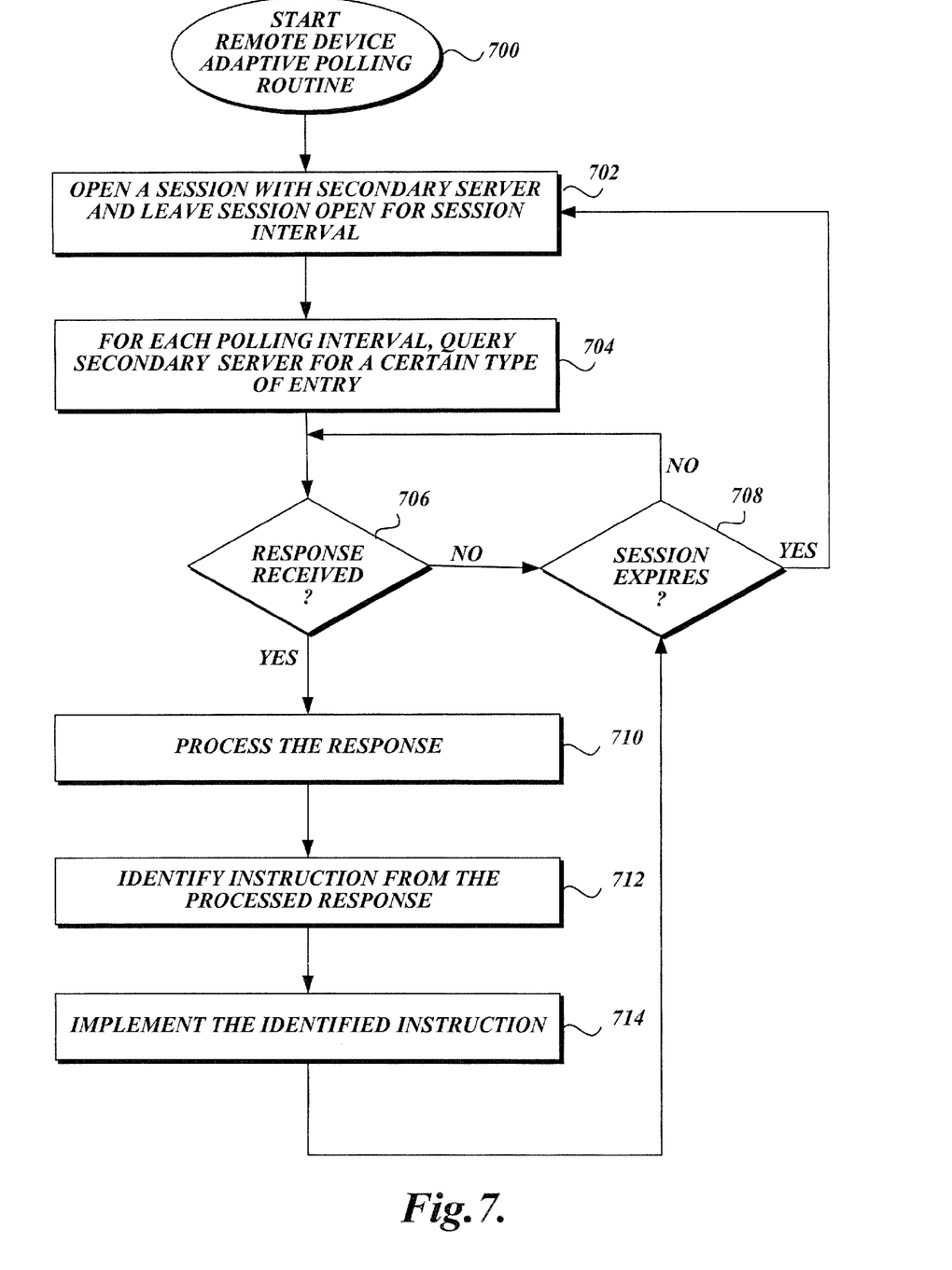
FIG. 7 is a flow diagram of an adaptive polling routine for a remote device receiving a primary server's instructions via a near-persistent connection with a secondary server.

FIG. 7 is a flow diagram of remote device adaptive polling routine 700 for obtaining instructions through the secondary server over a near-persistent connection between the remote device and the secondary server. As with FIGS. 5 and 6, it may be assumed that the secondary server maintains a name table which the primary server 102 and the remote device utilize before any actual communication connection is established between the remote device and the primary server 102. When the primary server 102 wishes to communicate with the remote device, the primary server 102 creates an entry corresponding to the remote device in the name table. Over a connectionless communication, the remote device periodically polls the secondary server to detect the created entry in the name table. For the purpose of discussion, it may be assumed that the remote device is configured to wait for a response from the secondary server during a connection interval. In addition, it may be assumed that the connection interval and polling interval are defined or updated by the primary server 102. At each polling interval, the remote device may query the secondary server for a certain type of entry in the name table. As a connection interval expires, the previous connection expires and the remote device re-opens a connection with the secondary server.

Beginning at block 702, the remote device opens a connection with a secondary server for transmitting a query for a response and receiving the response. The remote device keeps the connection open while waiting for the response to arrive from the secondary server for a connection interval. While having the connection open, the remote device may transmit a query, at each polling interval, to determine whether an entry has been created in the name table at block 704. At decision block 706, it is determined as to whether any response is received from the secondary server. In one embodiment, the secondary server only responds to a query from the remote device when there is an entry created by the primary server 102. Thus, the remote device keeps waiting for a response in the connection open state. If any response (i.e., any response containing some values) is received from the secondary server, it indicates that an entry corresponding to the remote device exists in the name table.

If no response is received, the remote device may check whether a connection has expired at decision block 708. If the connection has not expired, the routine 700 returns to decision block 706 and waits until the secondary server returns a response or the connection expires. If the connection has expired, the routine 700 returns to block 702 where the device re-opens a connection with the secondary server and repeats the above mentioned steps. In this manner, a connection between the secondary server and the remote device is nearly persistent, although the communication protocol is a connectionless one. In an advantageous aspect of this embodiment, data traffic between the secondary server and the remote device can be reduced because the secondary server does not transmit a response for each query. The secondary server transmits only when an entry for the remote device has been created.

If it is determined at decision block 706 that a response has been received from the secondary server, the remote device will process the response at block 710. If the response is returned from the secondary server, it may indicate that the device has to perform a particular task or an instruction. At block 712, the remote device identifies a request (instructions) from the processed response. For example, if the processing rules specify that a set of reserved IP addresses are used to instruct the remote device, the remote device may match the IP address contained in the response with the set of reserved IP addresses in order to identify the specific request (instruction). For another example, if the processing rules specify that a particular type of record, for example, a TXT record, is used to instruct the remote device, the remote device may expect that the response contains the value of the particular type of record and parse the response to extract the instruction(s) from the record. The remote device may perform the identified instruction(s) at block 714. It is to be noted that one of the identified requests may be a connection establish request. The routine 700 returns back to decision block 708 where it is determined whether the connection between the secondary server and the remote device has expired. The routine 700 repeats the above mentioned steps.

I claim:

1. A method for establishing a communication connection between a device and a primary server which enables a user to control the device, wherein communications between the primary server and the device use a computationally expensive protocol, the method comprising, at the primary server:
   detecting an event to communicate with the device;
   upon detecting the event, causing a secondary server to enter an entry corresponding to the device into a name table maintained by the secondary server to provide notification to an automated process, wherein the device is configured to use a computationally lightweight protocol comprising a user datagram protocol to poll the secondary server to detect that an entry corresponding to the device has been entered into the name table;
   receiving a connection initiation from the device to establish a communication connection in response to detection by the device of the entry in the name table;
   upon receipt of the connection initiation, establishing the communication connection with the device using the computationally expensive protocol; and
   causing the secondary server to delete the entry from the name table when the communication connection with the device is established.

2. The method of claim 1, wherein the event to communicate is triggered when a user request to control the device is received.

3. The method of claim 1, wherein the event to communicate is triggered when an internal need to communicate with the device is detected.

4. The method of claim 3, wherein the internal need is to update an application in the device.

5. The method of claim 1, further comprising causing the secondary server to time-stamp the entry when the entry is entered into the name table.

6. The method of claim 5, wherein the entry is configured to expire after a predetermined time interval, the method further comprising causing the secondary server to delete the entry from the name table when the entry has expired.

7. The method of claim 2, wherein causing the secondary server to enter the entry includes formulating a message to the secondary server, wherein the message reflects the user request to control the device.

8. The method of claim 7, wherein formulating the message includes extracting an instruction from the user request, wherein the instruction can be implemented by the device to fulfill the user request to control the device.

9. The method of claim 8, wherein the instruction is included in the entry corresponding to the device.

10. The method of claim 1, wherein the device is protected by a firewall that filters inbound data.

11. The method of claim 10, wherein the computationally expensive protocol is a persistent Transmission Control Protocol, the method further comprising terminating the communication connection after information is communicated to the device to fulfill a user request to control the device.

12. The method of claim 10, wherein the computationally expensive protocol is a Secure Socket Layer protocol.

13. The method of claim 10, wherein the computationally expensive protocol is a Transport Layer Security protocol.

14. The method of claim 10, wherein the computationally lightweight protocol is a connectionless protocol.

15. The method of claim 10, wherein the secondary server is a domain name server.

16. A method for establishing a communication connection between a device and a primary server, wherein the device is protected by a firewall and wherein communications between the primary server and the device use a computationally expensive protocol, the method comprising, at the device:
  transmitting an inquiry to a secondary server to detect whether the secondary server has a name table with an entry corresponding to the device to provide notification to an automated process;
  receiving a response to the inquiry from the secondary server; and
  if, according to the response, the secondary server has an entry corresponding to the device, then:
  establishing a communication connection with the primary server which enables the primary server to communicate with the device through the firewall;
  receiving information from the primary server over the communication connection,
  wherein communications between the secondary server and the device use a computationally lightweight protocol; and
  causing the secondary server to delete the entry from the name table when the communication connection between the primary server and the device is established.

17. The method of claim 16, wherein the information from the primary server includes an instruction, the method further comprising implementing the instruction at the device.

18. The method of claim 16, wherein the response to the inquiry is one of a positive response or a negative response, the positive response indicating that the secondary server has an entry corresponding to the device and the negative response indicating that the secondary server does not have an entry corresponding to the device.

19. The method of claim 18, wherein the device establishes the communication connection with the primary server upon receipt of a positive response from the secondary server.

20. The method of claim 19, wherein the communication connection established between the primary server and the device is a secure communication connection.

21. The method of claim 16, wherein the lightweight protocol is a connectionless protocol.

22. The method of claim 21, wherein the lightweight protocol requires fewer resources compared to the expensive protocol.

23. The method of claim 22, wherein the resources include at least one of bandwidth, processing time, or hardware.

24. The method of claim 16, wherein the secondary server is a domain name server in which entries can be dynamically entered into the name table.

25. The method of claim 16, wherein the secondary server is a subdomain of the primary server, which does not require using the expensive protocol to communicate with the device.

26. The method of claim 16, wherein the name table has an entry corresponding to the device only when the primary server wants to communicate with the device.

27. The method of claim 16, wherein the device establishes the communication connection by transmitting a connection initiation request to the primary server.

28. The method of claim 16, wherein the device transmits the inquiry to the secondary server on a periodic basis.

29. The method of claim 16, wherein the device transmits the inquiry to the secondary server on a frequent basis sufficient to detect the entry in near real-time after the entry has been entered into the secondary server.

30. A network system, comprising:
  a primary server configured to receive a user request to control a device that is remote from the user; and
  a secondary server configured to maintain a name table with table entries, wherein the secondary server is communicatively accessible to the device and to the primary server, the secondary server being further configured to respond to an inquiry from the device as to whether the name table has an entry corresponding to the device to provide notification to an automated process, wherein communications between the secondary server and the device use a lightweight protocol;
  wherein the primary server is further configured to cause the secondary server to enter an entry corresponding to the device into the name table when the primary server has received a user request to control the device, and wherein the primary server is further configured to establish a communication connection with the device responsive to detection by the device of the entry in the name table, and is operable to cause the secondary server to delete the entry from the name table when the communication connection between the device and the primary server is established.

31. The network system of claim 30, wherein the communication connection between the primary server and the device uses an expensive protocol that requires greater computational resources than the lightweight protocol.

32. The network system of claim 30, wherein the computational resources include one of network bandwidth, hardware or software resources.

33. The network system of claim 32, wherein the primary server is configured to formulate a message to the secondary server to insert a text record with the entry in the name table to reflect the user request to control the device.

34. The network system of claim 33, wherein the text record stores an instruction that can be implemented by the device.

35. The network system of claim 33, wherein the secondary server is configured to transmit the text record to the device when responding to the inquiry from the device.

36. The network system of claim 30, wherein the primary server is configured to formulate a message to the secondary server to include an Internet Protocol (IP) address with the entry corresponding to the device, wherein the IP address represents an instruction that can be implemented by the device.

37. The network system of claim 36, wherein the secondary server is configured to transmit the IP address to the device when responding to the inquiry from the device.

38. A system for controlling a remote device via a communication connection established by the remote device, comprising:
  a data repository component for maintaining a name table, wherein the data repository component is communicatively accessible by the remote device;

a computing device communicatively coupled to the data repository component, wherein the computing device is operable to:
- detect an event to control the remote device;
- cause the data repository component to enter into the name table an entry corresponding to the remote device to provide notification to an automated process;
- receive from the remote device a request to open a communication connection in response to the remote device having detected the entry in the name table;
- open the communication connection with the remote device upon receipt of the request; and
- transmit to the remote device information reflecting the event to control the device over the communication connection; and
- cause the data repository component to delete the entry from the name table when the communication connection with the remote device is established.

39. The system of claim 38, wherein the computing device is operable to cause the data repository component to enter the entry in the name table upon detecting the event.

40. The system of claim 39, wherein the event is triggered upon receipt of a user request to control the remote device.

41. The system of claim 40, wherein the computing device is further operable to identify an instruction that can be implemented by the remote device to fulfill the user request to control the remote device.

42. The system of claim 41, wherein the computing device is operable to formulate a message to the data repository component to include the identified instruction with the entry corresponding to the remote device.

43. The system of claim 42, wherein the computing device is further operable to transmit the message to the data repository component upon receipt of the user request to control the remote device.

44. The system of claim 41, wherein the computing device is operable to formulate a message to the data repository component to include an Internet Protocol (IP) address with the entry corresponding to the remote device, wherein the IP address represents the identified instruction.

45. The system of claim 41, wherein the information transmitted by the computing device to the remote device contains the instruction.

46. The method of claim 41, wherein the identified instruction is to change a time interval in which the data repository component receives an inquiry from the remote device for detecting the entry corresponding to the remote device.

47. The system of claim 38, wherein the computing device is communicatively coupled to the data repository component using a computationally lightweight protocol, and wherein the communication connection between the remote device and the computing device uses a computationally expensive protocol.

48. The system of claim 45, wherein the data repository component is configured to receive the inquiry from the remote device at predetermined intervals that are sufficiently frequent that the computing device receives the connection initiation from the remote device in near real-time after the computing device receives the user request.

49. The system of claim 38, wherein the data repository component is configured to receive an inquiry from the remote device to detect whether the name table has an entry corresponding to the remote device, the inquiry being received via a communication connection that is opened with the remote device when the inquiry from the remote device is received.

50. The system of claim 49, wherein the data repository component is configured to respond to the inquiry from the remote device only if the name table has an entry corresponding to the remote device.

51. The system of claim 50, wherein the communication connection is configured to remain open for a connection interval after the inquiry from the remote device is received.

52. The system of claim 51, wherein the connection interval is configured to restart each time the data repository component receives the inquiry from the remote device while the communication connection remains open.

* * * * *